March 5, 1940.   J. H. G. PEARCE   2,192,869
MANUFACTURE OF FLUORESCENT DISCHARGE TUBES
Filed Feb. 25, 1938
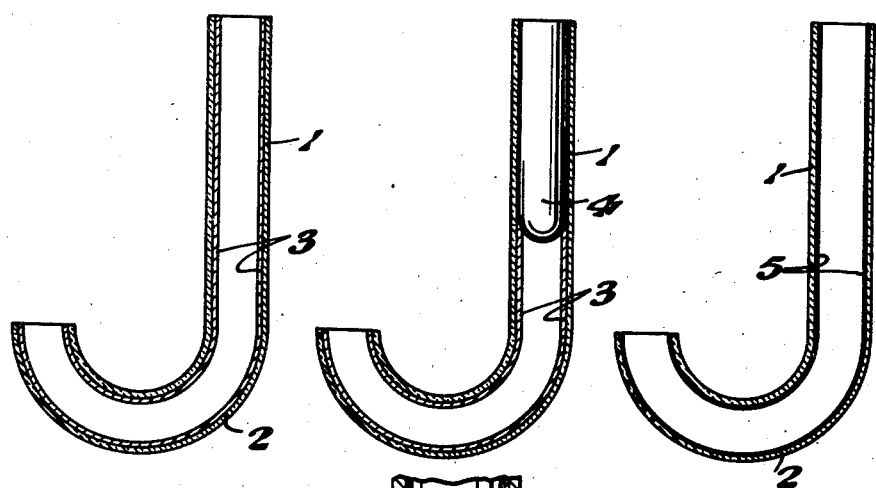
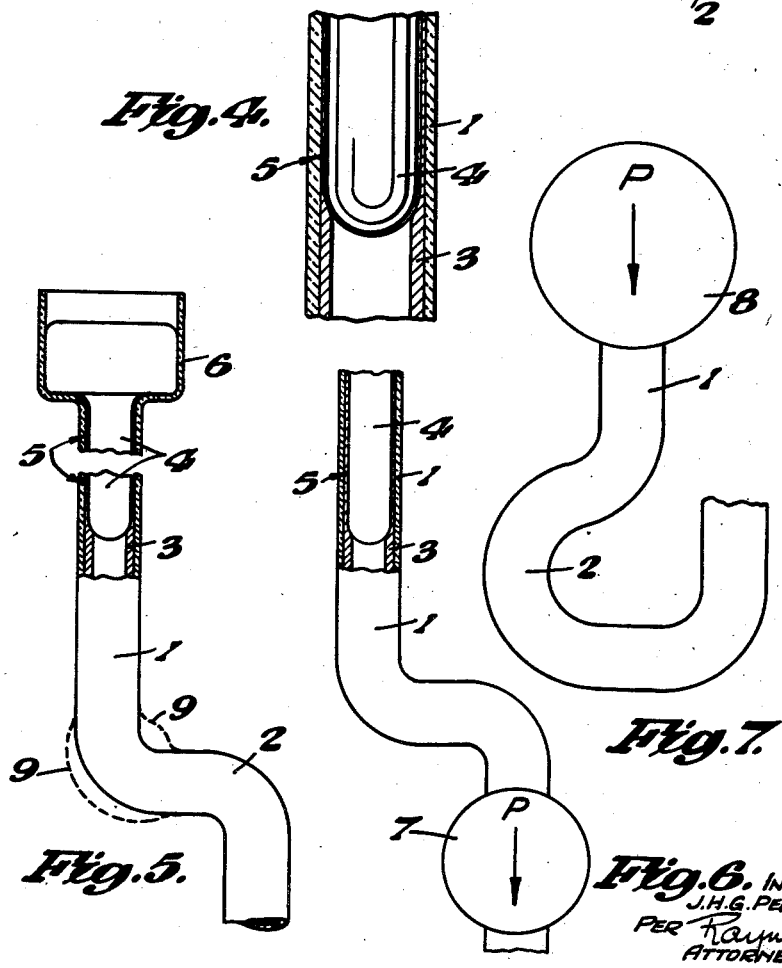
INVENTOR
J. H. G. PEARCE
PER Raymer Ho
ATTORNEYS Patented Mar. 5, 1940

2,192,869

UNITED STATES PATENT OFFICE 2,192,869

MANUFACTURE OF FLUORESCENT DISCHARGE TUBES

John Harold George Pearce, London, England

Application February 25, 1938, Serial No. 192,513
In Great Britain October 27, 1937

6 Claims. (Cl. 91—68)

This invention relates to improvements in the manufacture of fluorescent discharge tubes or hollow bodies of the type in which a layer of fluorescent material, preferably in powder form, is adhered to the inner walls of a suitable glass or other transparent tube or hollow body by means of an adhesive carrier medium. The object of the invention is to provide a method of applying the adhesive carrier medium to the inner walls of the glass or other transparent or translucent tube in a thin layer free from streaks or markings, as e. g. might be obtained if a solid body or a brush were used for spreading or thinning down the adhesive substance. Another object of this invention is to enable this to be carried out even when the tube has been bent to an irregular shape. A still further object of this invention is to obtain a very thin film of adhesive upon the interior of the tube or hollow body and of uniform thickness all over the interior of the tube or hollow body.

According to this invention a tube or hollow body to be used as a fluorescent discharge tube or hollow body is coated internally with an excess of the adhesive carrier medium and the coating of adhesive carrier medium whilst still in a soft, liquid or semi-liquid condition is subjected to the pressure of a dense flowing substance fed through the tube or hollow body.

In an embodiment of this invention an adhesive carrier medium in a liquid or semi-liquid form is introduced into the glass or other transparent or translucent tube and is run through the tube so as to leave an excess deposit all over the inner walls of the tube. The excess is then removed by passing through the tube a suitable mass of a relatively dense liquid such as mercury which is also run through the tube by pressure of any description or by gravity. In its passage through the tube the mercury or like dense liquid will squeeze out the excess adhesive medium pushing it along in front and leaving a thin even coating of adhesive distributed evenly over the inner walls of the tube.

Mercury is found to be a highly suitable substance for the purpose of removing the excess of the liquid adhesive medium from the walls of the tube. It will readily adapt itself to the contour of the tube, will pass freely around all bends and corners and will push the excess adhesive in front of it through the tube. The thickness of the coating remaining on the walls of the tubes may be regulated to a certain extent by the pressure or head of mercury which is passed through the tube to remove the excess of the liquid adhesive medium.

The tube may be filled with the liquid adhesive medium which may then be allowed to drain out. The tube may be either straight or may be bent to any suitable configuration desired. Following the introduction of the liquid adhesive medium to the tube, the tube may be exhausted of air to a greater or lesser degree and a suitable volume of mercury is introduced into the tube and is allowed to fall by gravity or is shaken or is forced by pressure or suction through the tube and if the tube is bent the mercury will travel round the various bends. The mercury will pass through the tube adapting itself to the cross section of the tube if it varies. In passing through the tube the mercury will remove the excess liquid adhesive medium from the walls of the tube and force it to travel along the tube in advance of the mercury, subsequently removing it from the tube altogether. In passing through the tube the mercury will, however, leave a deposit of the liquid adhesive medium distributed evenly all over the inner surface of the tube. This deposit will be absolutely smooth and free from streaks or blemishes. The fluorescent material in powder or other suitable form may be subsequently introduced into the tube and will adhere to the adhesive coating on the inner walls thereof. As an alternative however, the fluorescent material in powder or other form may be incorporated with the liquid adhesive medium so that an even coating of both the adhesive and the fluorescent material will be spread over the inner wall of the tube by the passage of the mercury and all excess will be removed from the tube as the mercury passes through it.

The desired degree of tackiness of the adhesive coating can be effected by passing hot air through the tube, or otherwise warming the tube.

The accompanying sheet of drawings somewhat diagrammatically illustrates methods of carrying the invention into practice, and wherein:

Figs. 1, 2 and 3 are sectional elevation views of a glass tube with a bend therein and showing successive stages of the process.

Fig. 4 is a broken detail sectional elevation view to a larger scale showing the removal of the surplus adhesive carrier medium, and Figs. 5, 6 and 7 are diagrammatic views showing different methods of feeding the mercury or high specific gravity liquid through the tube.

Referring to the drawing, in Figs. 1, 2 and 3 a glass tube 1 intended for a fluorescent discharge tube has a bend 2, and it is coated internally all over with an adhesive carrier medium or binder 3 to which is to be applied the luminous powder, or if desired the carrier medium or binder can have the luminous powder in suspension. Suitable luminous powders include zinc silicates with various forms of impurity, calcium tungstate, or other salt capable of being activated by the electromagnetic rays present in a discharge through a gas. These are used in conjunction with the various rare gas fillings such as neon, helium, xnenon, krypton or mercury-argon mixtures.

It has been ascertained that in the manufacture of these discharge tubes, envelopes or hollow bodies, it is desirable that the coating 3 of carrier medium or binder should be as thin as possible and yet uniformly distributed over the interior of the tube or its equivalent. Also it is desirable not to have brush marks or streaks in the carrier medium or binder, that is to say, the carrier medium or binder must be very thin and uniformly smooth all over the interior of the tube or envelope. For this purpose the coating 3 should be reduced to a very thin film all over the interior of the tube or envelope, i. e., with no irregularities at bends or corners, and this is effected by first applying a too thick, or surplus coating of the material 3 and then removing the surplus so as to leave only a very thin film of the carrier medium or binder on the interior of the tube or envelope.

This removal of the surplus carrier medium or binder is effected by passing through the tube or envelope a quantity of a dense liquid such as mercury, and in Fig. 2 a column of mercury 4 is forced, or allowed to flow by gravity, along the tube 1. The mercury contacts with the whole of the inner surface of the tube and will consequently fill all bends and corners, e. g., the bend 2. The pressure of this liquid substance of very high specific gravity has the result of squeezing out or spreading the carrier medium 3 into a thin film as shown in Fig. 4, the surplus being forced ahead of the column of mercury along the tube or envelope, until ultimately the whole of the tube or envelope has only a thin film 5 of carrier medium of uniform depth all over its inner surface.

The mercury can be introduced simply by pouring, or the tube or envelope 1 can have a reservoir 6 (see Fig. 5) formed at one end, and a supply of mercury 4 poured therein and allowed to fall by gravity down the tube 1. Alternatively one end of the tube can be connected to a vacuum pump 7 as in Fig. 6, and the other end connected to a mercury container, whilst as a further method a pressure pump 8 (see Fig. 7) can force the mercury along the tube 1. It will be apparent that any bends 2 or bulges 9 or crevices (see Fig. 5) will receive the full effect of the pressure of the mercury and that consequently the coating of carrier medium will be evenly thinly distributed over the whole of the interior of the tube without risk of streaking or brush marks, or using a ligature to pull through a scraper or wiper with consequent possibility of the ligature rubbing against the tube or envelope particularly at bends.

An example of this invention which proves very efficacious is to fill a bent glass tube, for example of about $14/15$ mm. diameter, with a mixture of phosphoric acid and ethyl alcohol (e. g., one of phosphoric acid to 30 of ethyl alcohol by volume), then to drain out the tube so as to leave a thick deposit of the mixture on the interior of the tube and to connect one end of the tube by a pipe to a tank containing mercury, open a tap in the pipe and allow the mercury to run through the tube under a head of about twelve inches. The tube is then emptied of mercury and connected to a hot air drying device to volatilise the alcohol, and the powder (if not already in suspension in the mixture) is delivered into the tube. This method gives a thickness of powder on the walls of the tube which is approximately one grain deep, this being a highly efficient result. The tube or envelope can be warmed during and/or immediately before the flow of mercury therethrough to obtain the desired softness of the adhesive substance.

By means of the present invention fluorescent discharge tubes or envelopes can be coated internally to a uniform and very thin depth with a fluorescent material this characteristic being obtained with tubes and envelopes having various configurations.

I claim:

1. Method of forming a luminescent coating on a tube or envelope of a fluorescent or luminous electric discharge tube consisting in forming on the interior of the tube or envelope a layer of a binder in excess of the ultimately required quantity and passing through the tube or envelope a very high specific gravity liquid whilst the binder is soft or yielding to light pressure, the said binder having suspended therein the luminous substance.

2. Method of forming a luminescent coating on a tube or envelope of a fluorescent or luminous electric discharge tube consisting in forming on the interior of the tube or envelope a layer of a binder in excess of the ultimately required quantity and passing through the tube or envelope a very high specific gravity liquid whilst the binder is soft or yielding to light pressure, a luminous substance then being delivered into the tube or envelope.

3. In the manufacture of a fluorescent or luminous electric discharge tube, charging the interior of the tube or envelope with a surplus quantity of binder spread over the interior of the tube or envelope and reducing the coating of the binder to a very thin film uniformly distributed over the interior of the tube or envelope by passing mercury through the tube or envelope so that the mercury traverses the whole of the inner surface of the tube or envelope whilst the binder is soft or yielding to light pressure.

4. In the manufacture of a fluorescent or luminous electric discharge tube, charging the interior of the tube or envelope with a surplus quantity of binder spread over the interior of the tube or envelope and reducing the coating of the binder to a very thin film uniformly distributed over the interior of the tube or envelope by passing mercury through the tube or envelope so that the mercury traverses the whole of the inner surface of the tube or envelope whilst the binder is soft and yielding to light pressure, and also applying suction to the tube or envelope to assist the flow and pressure of mercury.

5. In the manufacture of a fluorescent or luminous electric discharge tube, charging the interior of the tube or envelope with a surplus quantity of binder spread over the interior of the tube or envelope and reducing the coating of the binder to a very thin film uniformly distributed over the interior of the tube or envelope by passing mercury through the tube or envelope so that the mercury traverses the whole of the inner surface of the tube or envelope whilst the binder is soft or yielding to light pressure, and also applying pressure to the mercury to assist the flow and pressure of the mercury.

6. In the manufacture of a fluorescent or luminous electric discharge tube, charging the interior of the tube or envelope with a surplus quantity of binder spread over the interior of the tube or envelope and reducing the coating of the binder to a very thin film uniformly distributed over the interior of the tube or envelope by passing mercury through the tube or envelope so that the mercury traverses the whole of the inner surface of the tube or envelope whilst the binder is soft or yielding to light pressure, and also warming the tube or envelope during passage of the mercury therethrough.

JOHN HAROLD GEORGE PEARCE.